(12) United States Patent
Mayer et al.

(10) Patent No.: US 11,468,708 B2
(45) Date of Patent: Oct. 11, 2022

(54) VIDEOCONFERENCING USING HYBRID EDGE/CLOUD INFERENCE WITH MACHINE-LEARNED SYSTEMS

(71) Applicant: Google LLC, Mountain View, CA (US)

(72) Inventors: Brandon Mayer, New York, NY (US); John Finley, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/624,450

(22) PCT Filed: May 20, 2019

(86) PCT No.: PCT/US2019/033177
§ 371 (c)(1),
(2) Date: Dec. 19, 2019

(87) PCT Pub. No.: WO2020/236151
PCT Pub. Date: Nov. 26, 2020

(65) Prior Publication Data
US 2022/0075995 A1    Mar. 10, 2022

(51) Int. Cl.
*H04L 65/403*    (2022.01)
*G06V 40/16*    (2022.01)
(Continued)

(52) U.S. Cl.
CPC .......... *G06V 40/172* (2022.01); *G06F 21/32* (2013.01); *G06T 7/70* (2017.01); *H04L 65/403* (2013.01); *G06T 2207/10016* (2013.01)

(58) Field of Classification Search
CPC .. G06K 9/00; G06K 9/00268; G06K 9/00288; G06T 7/70; H04L 29/06;
(Continued)

(56) References Cited

U.S. PATENT DOCUMENTS

2017/0091570 A1* 3/2017 Rao ..................... G06K 9/00979
2018/0232566 A1* 8/2018 Griffin ................. G06F 16/5838
(Continued)

OTHER PUBLICATIONS

International Preliminary Report on Patentability for Application No. PCT/US2019/033177, dated Dec. 2, 2021, 9 pages.

*Primary Examiner* — Melur Ramakrishnaiah
(74) *Attorney, Agent, or Firm* — Dority & Manning, P.A.

(57) ABSTRACT

Systems and methods for providing a multi-step identification process using a hybrid edge/server infrastructure to generate machine learned inferences are provided. One example method includes obtaining sensor data of an environment including one or more user. The method includes selecting at least a portion of the sensor data that is associated with the one or more users. The method includes generating, using one or more machine learning models, an intermediate representation of the selected portion of the sensor data that represents the face of the one or more users. The method includes transmitting the intermediate representation and a request for a user identification based on the intermediate representation, the remote computing system configured to perform additional steps of the multi-step identification process using the intermediate representation and the machine-learned system. The method includes receiving a user identifier for the one or more users.

19 Claims, 7 Drawing Sheets

(51) Int. Cl.
*G06T 7/70* (2017.01)
*G06F 21/32* (2013.01)
(58) Field of Classification Search
CPC ......... H04L 65/403; G06F 21/32; H04N 7/15; H04N 7/147
USPC .......................................... 348/14.01–14.16
See application file for complete search history.

(56) References Cited

U.S. PATENT DOCUMENTS

2019/0130172 A1\* 5/2019 Zhong ................ G06K 9/00221
2020/0065563 A1\* 2/2020 Zou .................... G06K 9/00288

\* cited by examiner

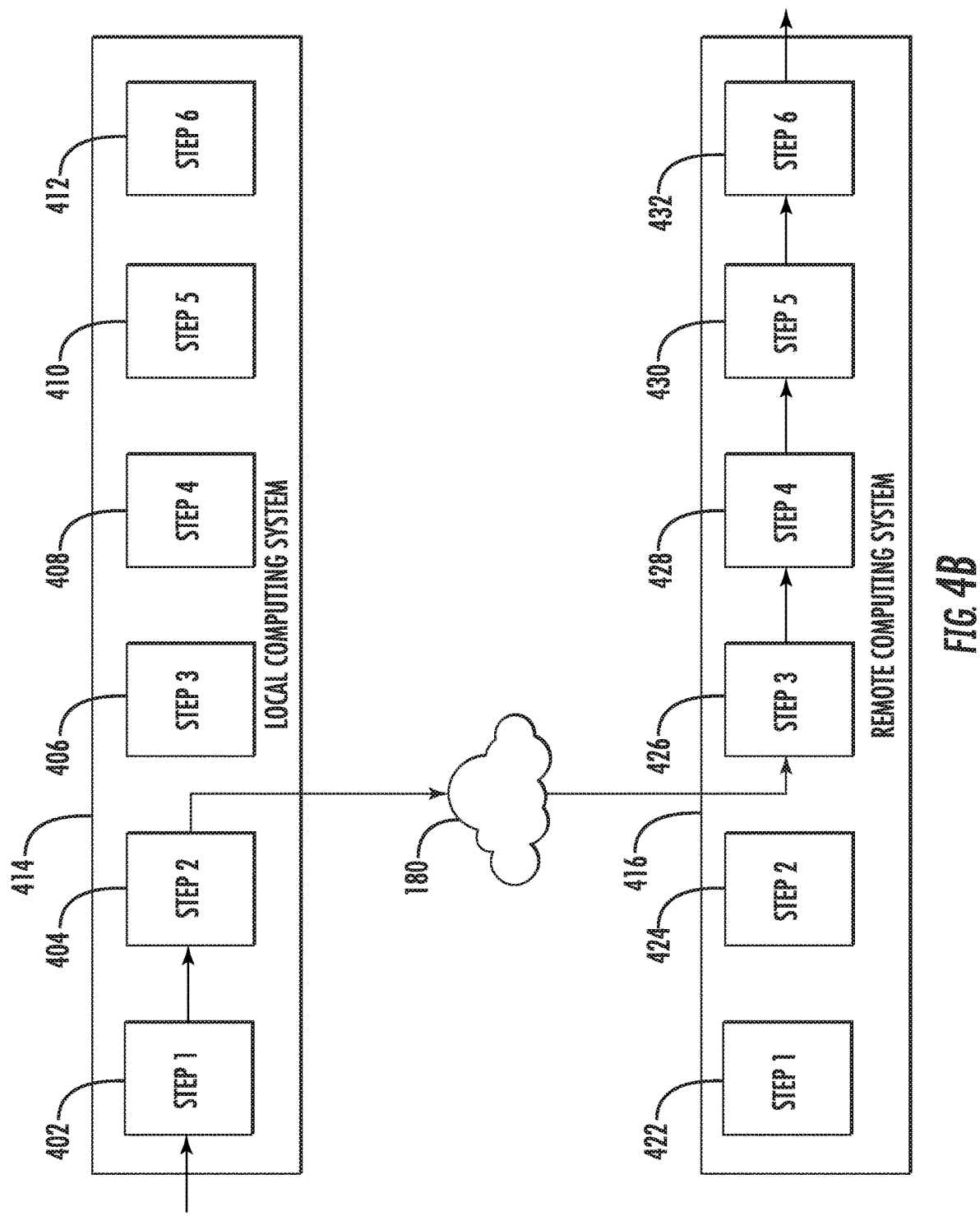

VIDEOCONFERENCING USING HYBRID EDGE/CLOUD INFERENCE WITH MACHINE-LEARNED SYSTEMS

PRIORITY CLAIM

This application is based upon and claims the right of priority under 35 U.S.C. § 371 to International Application No. PCT/US2019/033177 filed on May 20, 2019.

FIELD

The present disclosure relates generally to machine learning applications. More particularly, the present disclosure relates to a hybrid inference system that employs machine learning models spread over two systems.

BACKGROUND

As machine learning and artificial intelligence techniques have improved, they have been used with great success in a number of technology fields. Some applications for machine learning and artificial techniques include processes that include multiple steps to complete. The multiple steps may correspond to the use of different machine-learned models or performance of different operations on data that is input to or output from a machine-learned model. Furthermore, some applications of machine learning and artificial intelligence techniques occur in systems that include both a plurality of local computing devices (e.g., edge devices) and a central remote server that collects and distributes information to the one or more local computing devices. Any machine learning technique, application, process, or algorithm are therefore typically entirely performed at either a local computing device or the remote server.

Performing processing steps on a local computing device has the advantage of having access to higher quality data, lower latency, and the ease of multi-modal correlation. By executing the multi-step process (e.g., using an inference engine) on a local device, the system can avoid compression and network transmission of data which can introduce latency and may result in loss of at least some detail. In addition, the local computing device may be able to perform additional advanced inference techniques by more easily and accurately synchronizing data from multiple sensors at the local computing device.

Performing the steps of a machine learning based process (e.g., via the use of an inference engine) at a local computing device also has certain downsides. For example, each local computing device in a system may require sufficient compute power (e.g., processor power and memory space) to support intensive computations. Equipping local computing devices with this computational power raises the cost of each local computing device.

Conversely, there are potential downsides to performing the steps of the machine learning-based process at the central server system. For example, it is not always possible to send high-quality, raw, multimodal data to a remote server due to bandwidth and latency issues. As such, the added cost of sending high-quality, raw, multimodal data may be prohibitive. However, if the data is compressed to allow less costly and time-consuming transmission, some detail may be lost.

One example application that may benefit from the application of machine learning techniques is a video conferencing application. Video conferencing is already an inherently bandwidth intensive application, sending high definition audio and video to remote servers and multiple clients. Thus, the potential issues that arrive with transmitting high-quality, raw, multimodal data are even more potentially disruptive to the process.

In addition, variable bit-rate lossy compression is used in many existing video conferencing systems to compress the high definition raw data prior to transmission, either to remote participants in the video conference or to a dedicated remote server for further processing. As a result, the quality of sensor data received by remote servers is a function of client network conditions and is thus difficult to model and predict. Variable network conditions further introduce a variable amount of latency when requests are transmitted and can greatly affect the quality of the resulting inferences.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing a hybrid inference system for a variety of uses including intelligent video conferencing. The method includes obtaining, by one or more computing devices via one or more sensors, sensor data of an environment including one or more users. The method includes selecting, by the one or more computing devices using a machine-learned system comprising one or more machine-learned models, at least a portion of the sensor data that is associated with the one or more users. The method includes generating, by the one or more computing devices using the machine-learned system, an intermediate representation of the selected portion of the sensor data that represents the face of the one or more users, wherein generating the intermediate representation of the selected portion of the sensor data is at least one step in a multi-step identification process. The method includes transmitting, by the one or more computing devices to a remote computing system, the intermediate representation and a request for user identification based on the intermediate representation, the remote computing system configured to perform additional steps of the multi-step identification process using the intermediate representation and the machine-learned system. The method includes receiving, from the remote computing system, the user identifier for the one or more users.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 4A and 4B depict an example bifurcated multi-step processing system according to example embodiments of the present disclosure.

DETAILED DESCRIPTION

Figure 1A:
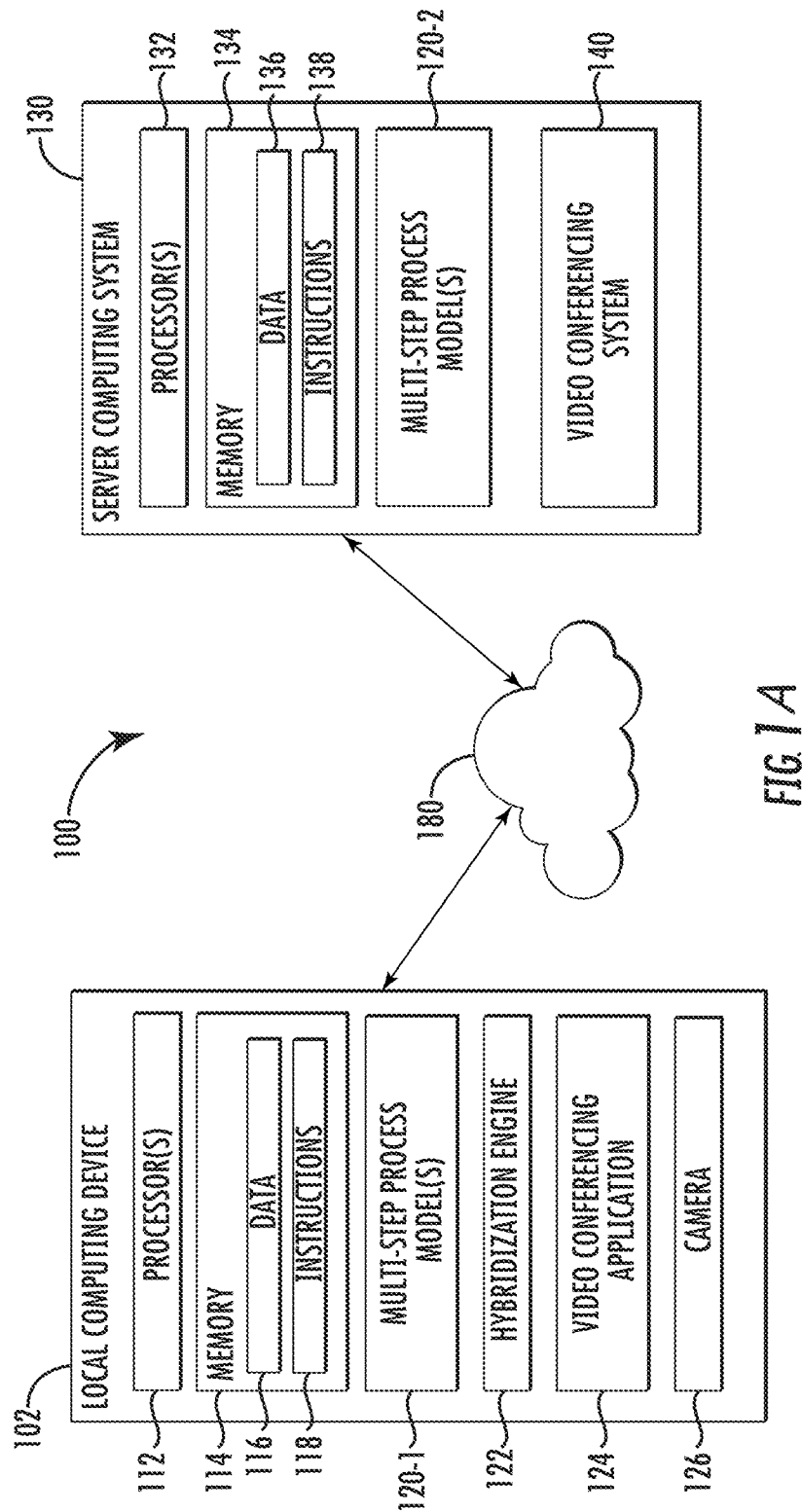
FIG. 1A depicts an example client-server system according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a hybrid local/cloud infrastructure for performing machine learning inference such as performing a multi-step identification process, with some steps being completed at a local computing device and other steps being completed at a remote server. As one example, a local computing device can enable one or more users to access a video conferencing service. The local computing device (or associated periphery devices) can include one or more sensors including, but not limited to: a camera for capturing high-quality image data, one or more microphones for capturing audio data, and/or other sensors configured to generate sensor data that is transmitted to a remote server and shared with other remote participants in the video conference. One or more participants in the video conference can be identified using one or more user identification techniques, such as by using speech recognition, facial recognition, and/or other processes. An identification process may be a multi-step process that includes a plurality of steps to generate one or more user identifiers such as a facial recognition or other user identifier. In some examples, one or more facial recognition identifiers may include one or more facial recognition inferences.

According to an aspect of the present disclosure, a multi-step facial recognition or other user identification process may be performed in a hybrid manner in which some steps are completed at the local computing device and other steps are completed at the remote server. In one specific example, the local computing device, using its camera, can capture high-quality raw image data of one or more users. The local computing device can then perform one or more steps of the multi-step facial recognition process and produce an intermediate data representation of the raw image. In some instances, the intermediate data representation may be referred to as an "embedding."

This intermediate representation can be transmitted to a server system where further steps in the multi-step facial recognition process are completed (e.g., the embeddings obtained from the local computing device can be compared to a gallery of embeddings to identify the video conference participants). When the multi-step facial recognition process is completed, one or more inferences generated by the remote server system can be transmitted back to the one or more local computing devices in real-time (e.g., while the video conference is still ongoing). When an inference identifies a particular face beyond a certain confidence threshold, that identification may be displayed in an interface associated with the video conference and/or other actions can be taken (e.g., personalization of settings based on participant identity). In this way, participants in a video conference can be quickly and reliably identified without costly local computing devices.

More particularly, the process of identification of one or more users using sensor data can be a multi-step process. To fully process the sensor data and identify a particular user may require significant computing resources. However, in view of privacy or other considerations, it may not be desirable to perform all the steps of the identification process at the local computing device that captures the sensor data. To efficiently perform the multi-step identification process, each step in the multi-step process may be performed separately from each other step. Some of the steps can be performed by the local computing device that captures the sensor data (e.g., an edge device) to produce an intermediate data representation. This intermediate data representation can then be transmitted to a remote server system, where the rest of the steps in the multi-step identification process are performed. Once the multi-step identification process is complete (e.g., the processes creates an inference associating a particular user identity with a user in a particular image or other sensor data), the remote server system can then send identifying information back to the local computing device.

In particular, the present disclosure is directed to enabling a system with local computing devices (e.g., edge devices) that connect to a central remote server system to efficiently and quickly provide data processing services. In this example, the data processing service is an identification process that requires multiple steps to identify one or more users from captured sensor data. In some examples, the identification process can be a facial recognition process. In other examples, the identification can rely on audio data and voice signatures to match the audio data to one or more users.

In some examples, the system enables a video conferencing system, with users (also termed participants) accessing the system from a plurality of local computing devices. The local computing devices can be configured to capture high-quality images of the participants in the video conference and, in at least some cases, transmit video and audio data to a remote server system to share with other local computing devices as part of the video conference. As noted above, the video used as part of the video conference itself (or other captured visual data) may be compressed before transmission and thus may not be as useful as the locally captured data for performing a facial recognition process or other identification process.

One option is to perform the entire identification process at the local computing device (e.g., the edge device). However, to do so may require significant processing resources, significant power, and enough storage to hold identification data for all possible matches. This may be undesirable for a number of reasons. For example, the cost of providing each local computing device with the processing resources necessary to perform the entire facial recognition process may be prohibitive. In addition, the local computing device may not have sufficient battery power or processing capability to perform the multi-step facial recognition process within a given time frame (e.g., before the end of the video conference). Memory limitations and policy considerations may also prevent the storage of facial recognition data for a plurality of users at each local computing device.

In another example embodiment, the image data captured at the edge device may be transmitted to the remote server system for processing. However, it is not always possible to send high-quality, raw image data to a remote server system. For example, video conferencing is a bandwidth intensive application and transmitting the captured visual data without compression may result in delays in transmitting and/or receiving data (e.g., high latency). In addition, if the data is compressed, at least some details may be lost, and the resulting inferences may suffer a resultant degradation in quality.

As a result, the present disclosure includes a system and method for a hybrid identification process wherein the inference engine that performs the multi-step identification process is bifurcated between the local computing devices and a central remote server system. For example, the local computing device can capture high definition image and/or video data and perform at least some steps of a multi-step facial recognition process. The local computing device may capture an image of an environment including one or more users who are participating in a video conference. The local computing device may then use a machine learning model to identify a section of the larger image that includes the face of one or more users. Once the identified section has been extracted from the larger image, the local computing device may perform additional steps to prepare an intermediate representation of the user's face that is invariant.

In another example, the identification process can use a LIDAR sensor to detect users within an environment. The specific sections of the LIDAR data associated with the users can be extracted from the general LIDAR data using a machine-learning trained model. The extracted sections can be processed to generate an intermediate representation of the data. A similar process can be used to extract relevant portions of audio data.

Returning to the facial recognition process example, an invariant representation of a face can be designed to be consistent regardless of the angle of the image or the lighting of the scene. In some example embodiments, this is accomplished with a machine learning model that takes image data as input and outputs a lower dimensional representation of the image (e.g., a series of numbers). For example, such a representation may take an image of a face as input, and, using a model trained by machine learning, generate a list of 128 numbers. The list of 128 numbers noted above is an intermediate data representation that may be referred to as an embedding. This list of 128 numbers can be generated such that it is largely invariant based on the conditions and angle of the original image. Thus, an image of a given user can produce the same list of 128 numbers or at least a very similar list of 128 numbers regardless of the context of the image (e.g., lighting, angle, resolution, rotation, and so on). Thus, a user may be identified based on a specific list of 128 numbers that is consistently produced when an image of the user's face is processed by the model.

In some example embodiments, the intermediate data representation can be transmitted to the remote server system. In some examples, there may be a variety of potential intermediate data representations at various steps in the multi-step process. The intermediate data representation may be stored with much less memory than the memory needed to store the raw captured image data from the local computing device. Thus, the cost to transmit and store the intermediate data representation can be significantly less than the cost to store and transmit raw captured high-quality data.

The remote server system can receive the intermediate data representation and continue to perform steps in the multi-step identification process (e.g., a facial recognition process). The remote server system can then compare the received intermediate data representation against a database of reference intermediate data representations associated with particular users. In some example embodiments, a comparison between the received intermediate data representation and each respective reference intermediate data representation in the database of intermediate data representations may result in a match score that represents the degree to which the received intermediate data representation matches the respective reference intermediate data representation.

The reference intermediate data representations may be stored as a key-value database (e.g., wherein the data is stored as a [user id, intermediate data representation] pair). This database may be commonly referred to as a gallery and the process of generating a new data pair in the gallery or augmenting an existing data pair can be called enrollment.

In some example embodiments, the server system generates an inference that connects the respective intermediate data representation with a particular user identity based on the reference intermediate data representation with the highest match score. For example, each reference intermediate data representation can be associated with a particular user. Then, when a particular reference intermediate data representation is selected as the best match for a given intermediate data representation, the server system has generated an inference that the given intermediate data representation is associated with the particular user.

In some example embodiments, the server system has a predetermined threshold match score. If no reference intermediate data representation has a match score that exceeds the predetermined threshold match score, the server system may determine that the received intermediate data representation does not match any of the reference intermediate data representations. In this case, the server system may return information indicating that no match was found.

In some example embodiments, the server system may select a subset of all reference intermediate data representations to compare to the received intermediate data representation(s). In some example embodiments, the server system may determine a location associated with one or more of the local computing devices. Using this location information, the server system may select a subset of reference intermediate data representations based on location information of known users. In other example embodiments, the local computing devices are associated with a particular organization, business, institution, or other group. In this case, the server system can select a subset of reference intermediate data representations associated with the particular organization, business, institution, or other group. In this way, the server system can limit the number of referred intermediate data representations that are compared to the received intermediate data representations. In some example embodiments, the server system saves time and power by comparing received intermediate data representation with a subset of the reference intermediate data representations instead of all possible reference intermediate data representations.

In some example embodiments, the server system initially compares the received intermediate data representations to the selected subset of reference intermediate data representations. If no reference intermediate data representation has a match score above the threshold score, the server system can then compare the received intermediate data representation to additional reference intermediate data representations.

In some example embodiments, when a local computing device receives a user identifier from the server system that matches a particular user in a video conference with a user identity, the local computing device can display the identity of the user either to: all users of the video conference, a subset of the users, one or more administrators of the video conference, or some combination of these groups.

Although the above discussion primarily used facial recognition as an example when describing the various methods and systems, there are a variety of uses for the above hybrid machine learning process. For example, a microphone can capture audio data from a plurality of users. The system can then convert the audio data into an intermediate representation. Once the audio data is converted to an intermediate representation it can be transmitted to a remote server system. The remote server system can use that data to generate user identity interferences or identifiers (e.g., by matching the intermediate representations of the audio against existing reference intermediate representations.).

In another example, the intermediate representation can be used to distinguish between different speaks without associating those speakers with a particular identity. For example, the inference engine can determine a total number of different speakers in a given portion of audio data and associated specific words or phrases with each speaker, such that the audio can be formatted to associated particular audio data with a particular speaker.

In yet another example, the inference engine can classify a role associated with a particular speaker (e.g., determining whether the speaker is a lecturer, is participating in a friendly conversation, or taking part in a debate). Once roles are associated with each speaker, the inference engine can generate a meeting type for the entire audio data portion. For example, the meeting types include, but are not limited to, a lecture, a friendly chat, a debate, a brainstorming session, a discussion, and so on.

In other examples, the hybrid inference engine can be used for implementations that do not involve identifying a particular user. For example, the hybrid inference system can be used to generate accurate three-dimensional (3D) models of one or more objects. For example, the local computing device can employ a camera and/or a LIDAR device to generate data representing a particular object. The generated data can be processed to generate an intermediate representation of the object. The intermediate representation can be transferred to the remote server system and further steps can be performed to generate an improved object model. For example, the inference engine can use visual and LIDAR data to generate improved models for a user's face, which can then be transmitted to other users and improve the quality of the displayed model.

Further to the descriptions above, a user may be provided with controls allowing the user to make an election as to both if and when systems, programs, or features described herein may enable collection of user information (e.g., information that allows a facial recognition process to identify a user's identity based on captured image data of the user or a user's current location), and if the user is sent content or communications from a server. In addition, certain data may be treated in one or more ways before it is stored or used so that a user's geographic location may be generalized where location information is obtained (such as to a city, ZIP code, or state level), so that a particular location of a user cannot be determined. Thus, the user may have control over what information is collected about the user, how that information is used, and what information is provided to the user.

The systems and methods described herein provide a number of technical effects and benefits. In particular, the present disclosure allows a facial recognition system to generate inferences beginning with raw, high-quality image data while reducing the costs needed to provide local computing devices and the cost necessary to transmit and store data to the remote server system. By performing some steps of the process at the local computing device and then transmitting an intermediate data representation to the server system where further steps of the process are performed, the system can reduce the cost of the local computing devices, reduce the cost of data storage and transmissions, and reduce processor usage without introducing significant latency into the system.

With reference now to the Figures, example embodiments of the present disclosure will be discussed in further detail.

Example Devices and Systems

FIG. 1A depicts an example client-server environment 100 according to example embodiments of the present disclosure. The client-server environment 100 includes a local computing device 102 and a server computing system 130 that are connected by and communicate through a network 180. Although a single local computing device 102 is depicted, any number of local computing devices 102 can be included in the client-server environment 100 and connect to server computing system 130 over a network 180.

In some example embodiments, the local computing device 102 can be any suitable device, including, but not limited to, a smartphone, a tablet, a laptop, a desktop computer, or any other computer device that is configured such that it can allow a user to participate in a video conference. The local computing device 102 can include one or more processor(s) 112, memory 114, a multi-step process model(s) 120-1, a hybridization engine 122, a video conferencing application 124, and a camera 126.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for implementing one or more multi-step process model(s) 120-1, a hybridization engine 122, and a video conferencing application 124. The local computing device 102 can implement the more multi-step process model(s) 120-1, a hybridization engine 122, and a video conferencing application 124 to execute aspects of the present disclosure, including directing communications with server computing system 130, providing a video conferencing application to a user, and performing a multi-step facial recognition process to receive facial recognition inferences or other identifiers with very little latency.

It will be appreciated that the terms "system" or "engine" can refer to specialized hardware, computer logic that executes on a more general processor, or some combination thereof. Thus, a system or engine can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the local computing device 102 or received from the server computing system 130), that can be retrieved, manipulated, created, or stored by the one or more processor(s) 112. In some example embodiments, such data can be accessed and displayed to one or more users of the local computing device 102 during a video conference or transmitted to the server computing system 130.

In some example embodiments, the local computing device 102 includes one or more multi-step process model(s) 120-1. A multi-step process model 120-1 can utilize one or more machine learning models to perform a multi-step process. For example, the multi-step process model 120-1 can generate embeddings for use in a multi-step identification process such as a facial recognition process. More specifically, the one or more machine learning models may generate embeddings for use in generating matches with reference embeddings (e.g., for facial recognition or other identification methods) by processing low-level features of sensor data (e.g. pixel data for image data). The one or more machine learning models can include one or more of: neural networks, non-linear models, and/or linear models. In one example implementation the one or more machine learning models may comprise a neural network model that includes an output layer and one or more hidden layers that each apply a non-linear transformation to a received input to generate an output. The neural network model may be trained to generate embeddings for use in the identification process using known methods for training neural network models to generate embeddings or another intermediate representation, based on the backpropagation technique. The multi-step process model 120 can work in concert with the multi-step process model 120-2 at the server computing system 130 to generate inferences based at least in part on data gathered by the local computing device 102. For example, during a video conference, the local computing device 102 can capture video data of one or more participants in a room. Gathering this data can be the first step in the multi-step process. In some example embodiments, the multi-step process is a facial recognition process.

In some example embodiments, the multi-step process model(s) use the high-quality sensor data collected at the local computing device 102 and perform at least one step of the multi-step process. For instance, the camera 126 captures raw image data that includes images of a user or a group of users. In another example, the sensors can include a microphone that captures audio data and/or a LIDAR system that generates LIDAR data.

In one example, the identification process is a multi-step facial recognition process. The first step in a multi-step facial recognition process may include analyzing a raw captured image to identify and extract one or more portions of the image that contain an image of the face of at least one user (or participant). In some example embodiments, a model has been trained specifically to perform this step. Thus, given an image as input, the model returns one or more portions of the image, each portion also having an associated confidence score, the confidence score representing the likelihood that the section includes a face. In addition, the model may also generate metadata about the one or more portions of the image, including but not limited to: the total number of faces identified or the number of image portions generated.

In some example embodiments, the multi-step facial recognition process performed by the multi-step process model(s) 120-1 includes, as part of the process, accessing the hybridization engine 122 to determine which further steps (if any) should be performed at the local computing device 102. The hybridization engine 122 can determine, based on one or more criteria, which steps in the multi-step process to complete at the local computing device 102 before transmitting the resultant data to the server computing system 130.

The one or more criteria can include, but are not limited to one or more of: the expected battery life at the local computing device 102, the bandwidth available to transmit data to and receive data from the server computing system 130, the computing power available at the local computing device 102 (e.g., this may include an estimated time to finish each step with the processor(s) 112), and any preferences associated with users of the local computing device 102 or other users participating in a video conferencing session.

In accordance with a determination, by the hybridization engine 122, that further steps of the multi-step facial recognition process are to be performed at the local computing device 102, the multi-step process model(s) 120-1 can access a model (e.g., either the same model as the first step or a second model) to perform the second step in the multi-step facial recognition process. In some example embodiments, the second step includes using a model to extract feature information from one or more image portions (e.g., the portions of the raw image that include a user's face as determined by a model in the first step of the process).

It should be noted that although the second step is described as a single process utilizing a single model to extract features from an image (e.g., the portion of a raw image that includes a face of a user), this extraction process can be implemented as a series of steps, each of which includes using input from the previous model and produces an intermediate data representation.

As with each step in the multi-step process, the hybridization engine 122 determines whether to continue with further steps or to transmit an intermediate data representation to the server computing system 130. In accordance with a determination by the hybridization engine 122 that at least one more step is to be performed at the local computing device 102, the multi-step process model(s) perform an additional step. In this case, the third step includes using extracted features to produce an invariant intermediate data representation. An invariant data representation can be a data representation for a face in an image that is very consistent even as other variables in the image change. For example, if the angle or lighting of the photo change, the invariant representation of a user's face can remain very similar.

In some example embodiments, the invariant data representation of the user's face can be referred to as an embedding and includes a list of 128 numbers that represent a specific user's face. In some example embodiments, the list of 128 number generated for a particular user's face will be very similar without regard to the angle of the face in the source image or the lighting to the source image In some example embodiments, once the invariant intermediate data representation is generated, the local computing device 102 can transmit the intermediate data representation (e.g., a two-dimensional embedding) to the server computing system 130. Although there are further steps in the multi-step process, the matching step that occurs using the invariant intermediate data representation are performed at the server computing system 130 regardless of any other criteria. This is so because the matching steps involve comparing a generated invariant data representation to a plurality of reference invariant data representations. There exist practical and policy reasons for not storing reference invariant intermediate data representations.

For example, reference invariant data representations may be stored at the server computing system 130 and not be transmitted to the local computing system 102 due to privacy considerations. In this way, the server computing system 130 can exercise more strict privacy and security control over the reference intermediate data representations. For example, the reference invariant data representations may include data that allows third parties to facially identify users that have been enrolled in the gallery. If that data is sent to local computing devices the chance of it been accessed by an unwanted party increase. Thus, to ensure that data is kept private and secure as much as possible, the reference invariant data representations are always stored at the server computing system 130. Thus, the final step in the multi-step process (e.g., comparing a current invariant data representation to one or more reference invariant data representations to find a match) can be performed at the server computing system 130.

As noted above, the hybridization engine 122 determines, based on one or more criteria, which steps of the multi-step process to perform at the local computing system 102. In general, when conditions indicate one or more of: low battery power, low computing resources, and high-bandwidth the hybridization engine 122 can determine that more steps are to be performed at the server computing system 130. In contrast, when conditions indicate that there is low available bandwidth and/or high expected latency, the hybridization engine 122 can determine that more steps are performed at the local computing device 102.

In some example embodiments, the hybridization engine 122 establishes a particular step in the multi-step process (e.g., step three in the multi-step process) that can be used by the local computing system 102 as the last step to be performed throughout a video conference. In other example embodiments, the hybridization engine 122 can re-evaluate one or more criteria at the end of each step or on a predefined schedule and potentially alter the selected step based on changing conditions.

The local computing device 102 can execute a video conferencing application 124. The video conferencing application can capture image data from a camera 126 and transmit that data to the server computing system. The local computing device 102 can receive, from the server computing system 130 image data from one or more other participants of the video conference (e.g., other local computing devices 102). The local computing device 102 can then display the received image data to users of the local computing device 102. In some example embodiments, the camera 126 collects image data from one or more users. The camera can be any device capable of capturing visual data.

In accordance with some example embodiments, the server computing system 130 can include one or more processor(s) 132, memory 134, one or more multi-step process model(s) 120-2, and a video conferencing system 140. The memory 134 can store information accessible by the one or more processor(s) 132, including instructions 138 that can be executed by processor(s) and data 136.

The server computing system 130 be in communication with one or more local computing device(s) 102 using a network communication device that is not pictured. The one or more multi-step process model(s) 120-2 are machine learning trained models. These models are kept consistent with the one or more multi-step process model(s) 120-1 at the local computing device 102. As a result, the output generated by either of the one or more multi-step process model(s) (120-1 or 120-2) at the local computing device 102 or the server computing system 130 will be consistent given the same input.

In some example embodiments, the one or more multi-step process model(s) 120-2 receives data from the local computing device 102, the data can be an intermediate representation of a user's face. In addition, the one or more multi-step process model(s) 120-2 may also receive a step indication, the step indication noting the next step to be performed on the intermediate data representation. As noted above, the received intermediate representation may be at any step of the multi-step process and the step indication allows the one or more multi-step process model(s) 120-2 to continue the multi-step process at any stage.

In some embodiments, the received intermediate data representation is the invariant intermediate data representation (e.g., also known as an embedding) that includes 128 numbers. If the intermediate data representation has not reached this stage, the one or more multi-step process model(s) 120-2 may continue to perform the steps described above until the invariant intermediate data representation has been reached.

Once the invariant data representation has been generated, a model in the one or more multi-step process model(s)s 120-2 can match the invariant intermediate data representation against a plurality of reference invariant data representations, each of which is associated with a particular pre-registered user of the video conferencing system 140. In this way, the one or more multi-step process models 120-2 can generate an inference associating the current invariant data representation with the identity of a specific user. This inference can then be transmitted to the local computing system 102 (or other local computing systems) for display.

The network 180 can be any type of communications network, such as a local area network (e.g., intranet), wide area network (e.g., Internet), or some combination thereof. In general, communication between the local computing device 102 and the server computing system 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

Figure 1B:
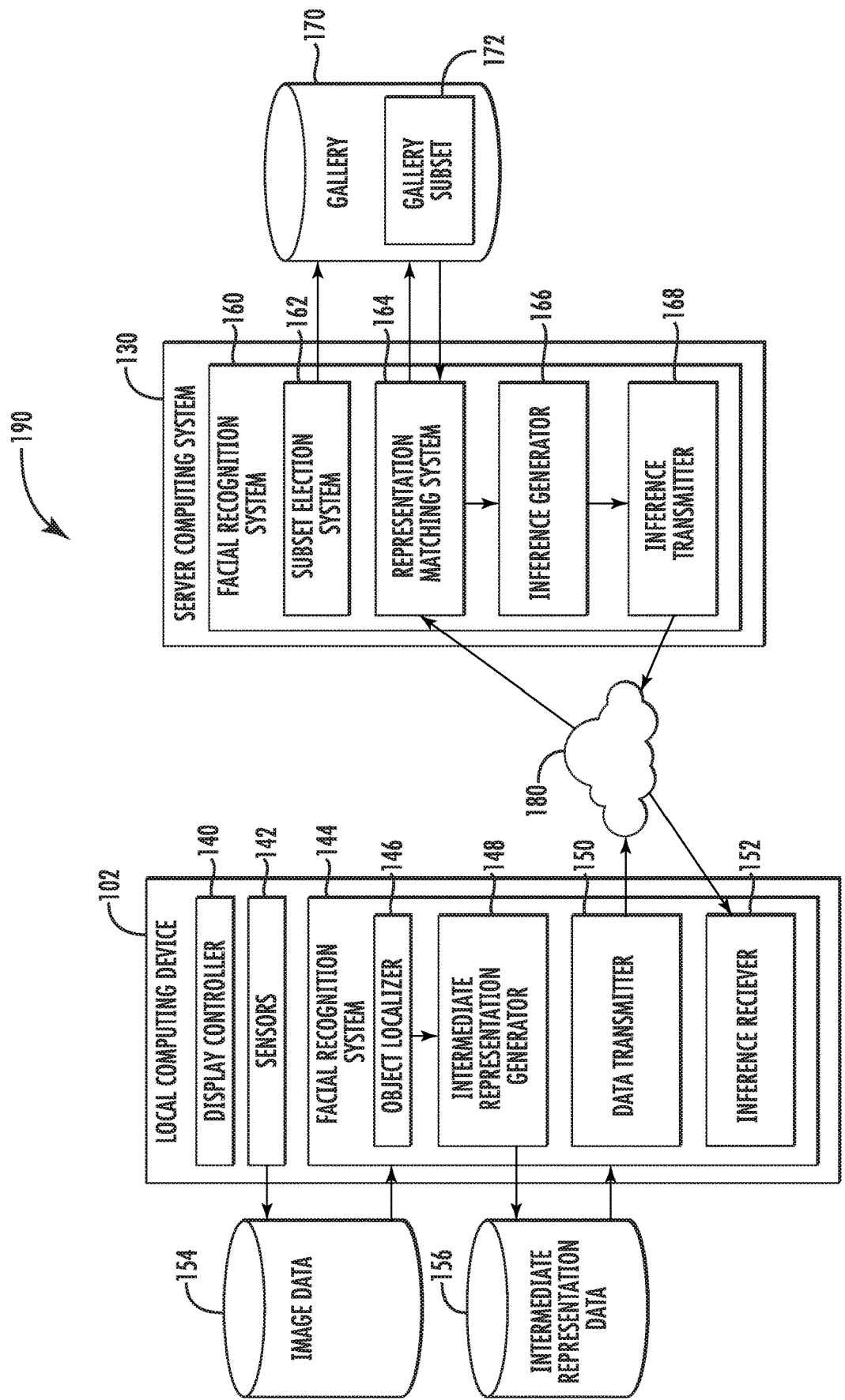
FIG. 1B depicts an example client-server system according to example embodiments of the present disclosure.

FIG. 1B depicts an example client-server environment 190 according to example embodiments of the present disclosure. The client-server environment 190 includes a local computing device 102 and a server computing system 130 that are connected by and communicate through a network 180. Although a single local computing device 102 is depicted, any number of local computing devices 102 can be included in the client-server environment 190 and connect to server computing system 130 over a network 180.

In some example embodiments, the local computing device 102 can be any suitable device, including, but not limited to, a smartphone, a tablet, a laptop, a desktop computer, or any other device that is configured such that it can execute a video conferencing application. The local computing device 102 can include a display controller 141, one or more sensors 142, a facial recognition system 144, an image database 154, and an intermediate representation database 156.

A display controller 141 can receive data from the local computing device 102 and cause a display associated with the local computing device 102 to display the desired images or set of images (e.g., a video). In some examples, the local computing device 102 can execute a video conferencing application. Thus, the local computing device 102 receives video content from a server computing system 130 and the display controller 141 causes a display to display the received video content and allows the users of the local computing device 102 to view video or raw images captured of other participants of the video conference located remotely from the local computing device 102.

The local computing device 102 includes one or more sensors 142 that can capture audio and/or visual data including but not limited to a camera and a microphone. In this example, a camera can capture raw, high-quality image data and stores it in an image database 154.

The facial recognition system 144 can include a face localizer 146, an intermediate representation generator 148, a data transmitter 150, and an inference receiver 152. In some embodiments, the face localizer 146 can access raw image data stored in the image database 154. In some example embodiments, the face localizer 146 includes or accesses a machine-learning trained model and performs a step in the multi-step facial recognition process discussed above. In some embodiments, the face localizer 146 accesses one or more images as input and outputs a portion of an image that includes a face of a user.

In some example embodiments, an intermediate representation generator 148 receives, as input, the portion of an image that includes the face of a user output by the face localizer 146. The one or more machine learning-trained models, as discussed above with respect to FIG. 1A, may be employed as part of a multi-step process for performing facial recognition as part of the intermediate representation generator 148. Using the one or more models, the intermediate representation generator 148 can perform one or more steps in the multi-step process and ultimately output an intermediate data representation. The outputted intermediate data representation can include a two-dimensional representation of a user's face as a series of numbers that represent features of the face included in the inputted portion of a raw image. For example, the output could be an embedding that includes 128 numbers.

In some example embodiments, the generated intermediate data representation is stored in the intermediate representation database 156. The data transmitter 150 can access an intermediate data representation stored in the intermediate representation database 156 and transmit the intermediate data representation for a particular user's face to the server computing system 130.

In some example embodiments, the server computing system 130 includes a facial recognition system 160 that works in concert with the facial recognition system 144 at the local computing device 102 to generate inferences that associate identities with intermediate data representations received from a local computing device 102. The facial recognition system 160 can include a subset election system 162, a representation matching system 164, an inference generator 166, and an inference transmitter 168.

A subset-election system 162 may work in combination with a video conferencing system (e.g., video conferencing system 140 in FIG. 1A) to select a subset of the reference intermediate data representations for a given video conference. For example, the subset election system 162 can determine one or more organizations associated with the current video conference based on user registration information, video conference location information, past video conference information, and so on. Once one or more organizations are associated with the video conference, the subset election system 162 can select a subset of reference intermediate data representations associated with the one or more organizations. Such organizations can include companies, educational organizations, non-profit organizations, governmental organizations, and so on.

Similarly, the subset may be chosen based on a number of factors including the location of the participants of the video conference, the time of the video conference, a stated theme or subject associated with the conference and so on. Once the subset has been identified for a given video conference, the associated reference intermediate data representations may be moved from the general gallery 170 to the gallery subset 172. It should be noted that designating one or more reference intermediate data representations as part of a given gallery subset 172 may result in the actual movement of data from one location in memory to another. Instead the subset election system 160 can designate the selected reference intermediate data representations as part of the subset without moving data entries from one area of the gallery database 170 to another.

The representation matching system 164 can receive an intermediate data representation from a local computing device 102. The received intermediate data representation may also include a request to identify a user. The received intermediate data representation can be a series of numbers that serves as an invariant representation of a user's face. As noted above, a representation is invariant if the intermediate representation is accurately produced for a given user without regard to the angle of the source image or the lighting of the source image.

Once the intermediate data representation is received, the representation matching system 164 can be matched against a plurality of reference intermediate data representations stored in the gallery database 170, or a gallery subset 172 if possible. The representation matching system 164 can use a machine learning model or other algorithm to generate a similarity score for each reference intermediate data representation.

In some example embodiments, the similarity scores produced by the representation matching system 164 are then used as input by the inference generator 166. The inference generator determines whether any reference intermediate data representation has a similarity score that exceeds a predetermined threshold score. The highest similarity score that exceeds the predetermined threshold score can then be determined to be associated with the matching identity.

In some example embodiments, the inference transmitter 168 transmits the determined identity to the local computing system as an identity inference. The inference receiver 152 at the local computing device 102 can receive the identity reference for display to users while the video conference is still ongoing. As noted above, the network 180 can be any type of communications network.

Figure 2:
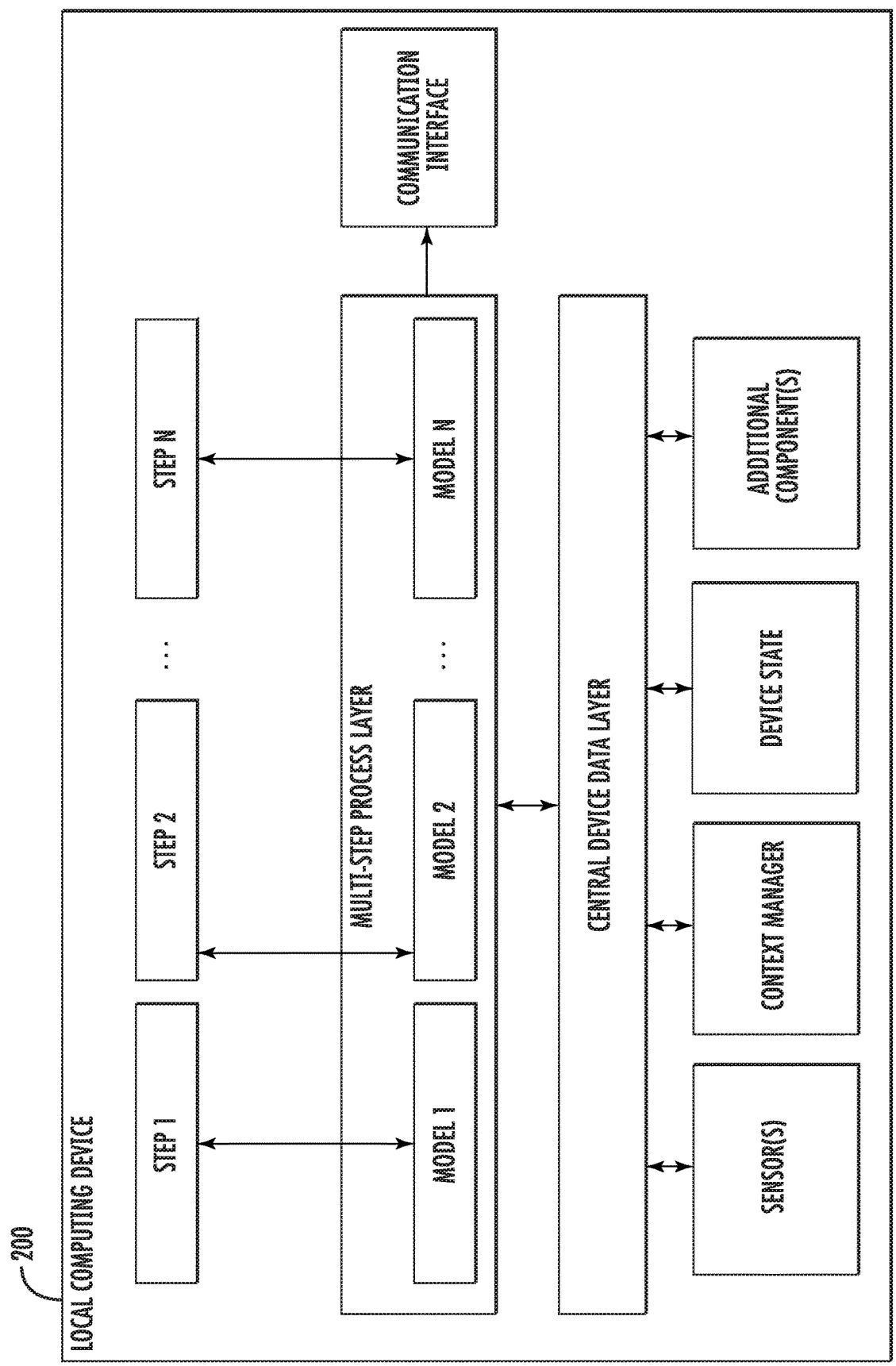
FIG. 2 depicts an example local computing device according to example embodiments of the present disclosure.

FIG. 2 depicts a block diagram of an example computing device 200 that performs according to example embodiments of the present disclosure. The computing device 200 can be a user computing device or a server computing device.

The computing device 200 includes a depiction of a number of steps of a multi-step process (e.g., steps 1 through N). Each step utilizes a model (e.g., models 1 to N) in the multi-step process layer to perform each step in the plurality of steps. In some example embodiments, each step can include communication with the central device layer.

The multi-step process layer includes a number of machine-learned models. For example, as illustrated in FIG. 2, a respective machine-learned model (e.g., a model) can be provided for each step and managed by the multi-step process layer. In other example embodiments, two or more steps can share a single machine-learned model. For example, in some example embodiments, the multi-step process layer can provide a single model (e.g., a single model) for all of the steps. In some example embodiments, the multi-step process layer is included within or otherwise implemented by an operating system of the computing device 200. In addition, one or more models that are displayed as being distinct in this example may in fact be different layers of a single model that operator to perform one or more steps each.

The multi-step process layer can communicate with a central device data layer. The central device data layer can be a centralized repository of data for the computing device 200. As illustrated in FIG. 2, the central device data layer can communicate with a number of other components of the computing device, such as, for example, one or more sensors, a context manager, a device state component, and/or additional components. In some example embodiments, the central device data layer can communicate with each device component using an API (e.g., a private API). In some example embodiments, the multi-step process layer connects to a communications interface for transmitting and receiving data from other computing devices.

Figure 3:
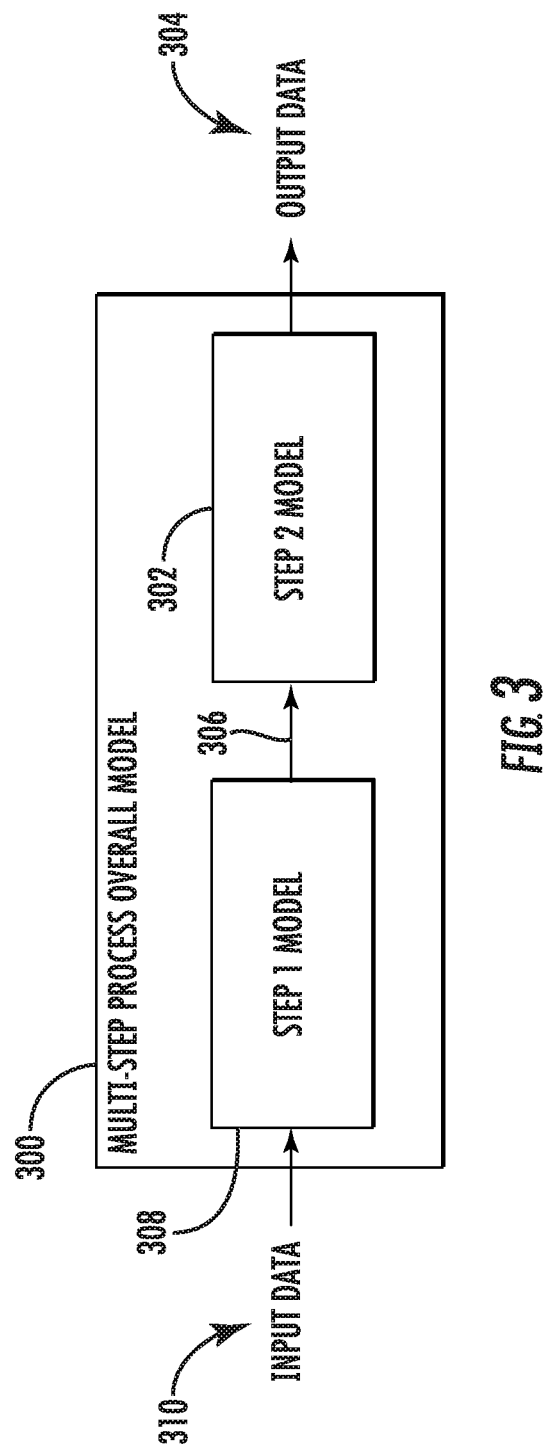
FIG. 3 depicts an example multi-step process model according to example embodiments of the present disclosure.

FIG. 3 depicts a block diagram of an example overall model 300 for the multi-step process, according to example embodiments of the present disclosure. As seen in this example, the overall model 300 receives input data 310. In some examples, the input data 310 for the overall model 300 is one or more raw images and the associated data.

In this example, the overall model 300 for the multi-step process includes two distinct models, the first for step 1 308 and the second for step 2 302. In some examples, the step 1 model 308 passes its output 306 to the step 2 model 302 as input. Ultimately, the output data for this multi-step process is one or more user identity inferences.

Figure 4A:
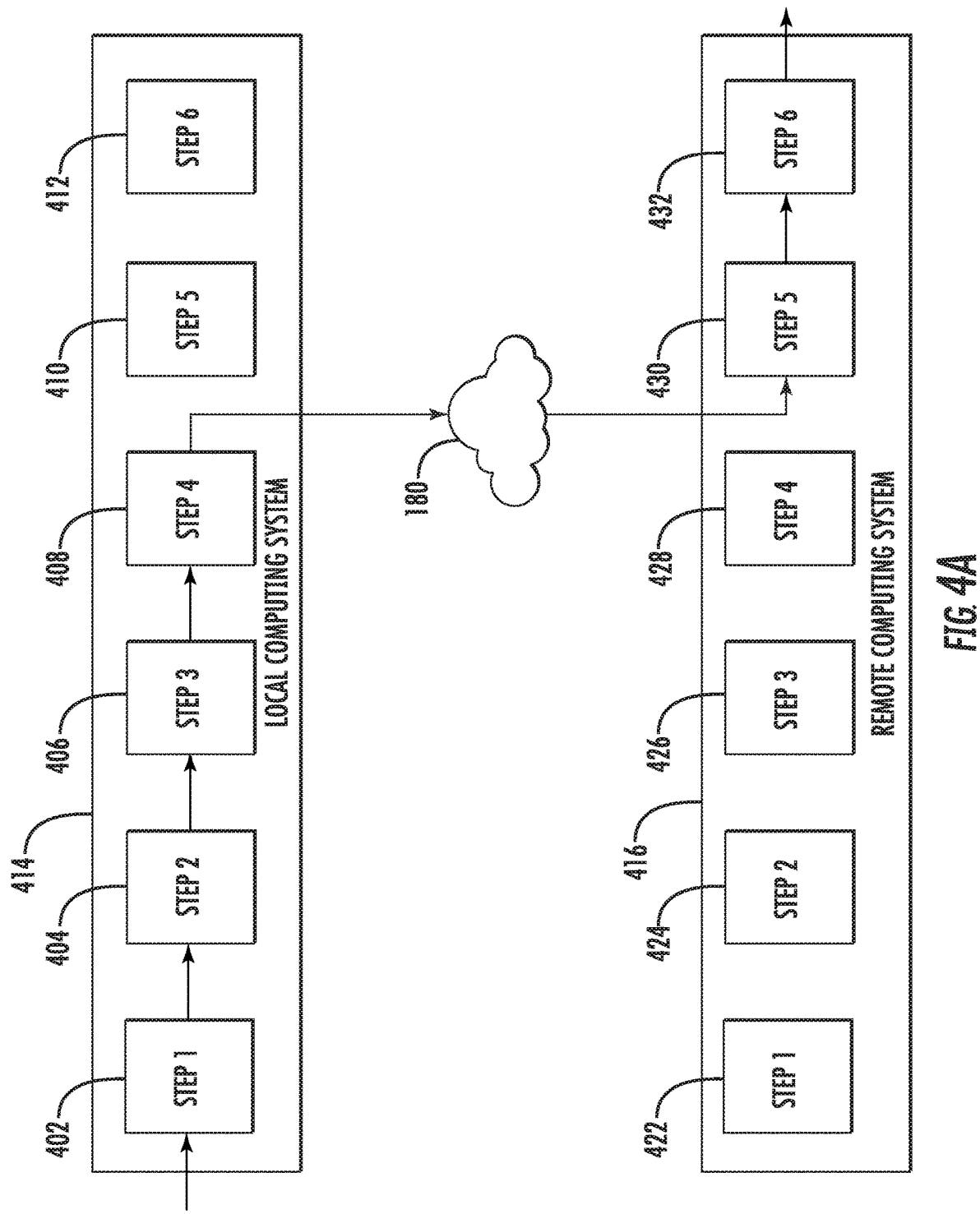

FIG. 4A depict a block diagram of a multi-step process system that exists over two different system, according to example embodiments of the present disclosure. As depicted in this example, a local computing system 414 and a remote computing system 416 both include a multi-step process that mirror each other. Thus, the first step 402 at the local computing system 414 matches the first step 422 at the remote computing system 416. This pattern holds for steps 2 (404 and 424), 3 (406 and 426), 4 (408 and 428), 5 (410 and 430), and 6 (412 and 432).

In this example, the local computing system 414 receives input from one or more sensors at the local computing system 414. For example, the local computing system 414 includes a camera that captures raw, high-quality visual data as input to the multi-step process.

Once the input has been received, the local computing system 414 determines a number of steps to perform at the local computing system 414. This determination may be made based on a number of criteria. In this example, the local computing system 414 determines that all the steps up until step 4 408 are to be performed at the local computing system 414.

Thus, steps 1 through 4 (402-408) are performed at the local computing system 414. Once step 4 408 has been performed and an intermediate data representation has been generated, the local computing system 414 transmit the intermediate data representation to the remote computing system 416 via a network 180.

In some example embodiments, the remote computing system 416 can then complete steps 5 430 and step 5 432. In some examples, the remote computing system 416 receives the intermediate data representation via the network 180. The remote computing system 416 continues performing steps in the multi-step process based on the most recent step performed at the local computing system 414. In this example, steps 1-4 were performed at the local computing system 414. As a result, steps 5 and 6 are performed at the remote computing system 416.

FIG. 4B depict a block diagram of a multi-step process system that exists over two different system, according to example embodiments of the present disclosure. This FIG. 4B depicts the same multi-step process system depicted in FIG. 4A. However, in this example, the local computing system 414 determines that Step 2 should be the last step performed at the local computing system 102.

Thus, in this example, the local computing system 102 completes step 1 402 and step 2 404 and then transmits an intermediate data representation from the local computing system 414 to the remote computing system 416 via a network 180. The remote computing system 415 then continues performed step 3 426, step 4 428, step 5 430, and step 6 432. Thus, the entire multi-step process can be performed regardless of which step is the final step performed at the local computing system 414.

Example Methods

Figure 5:
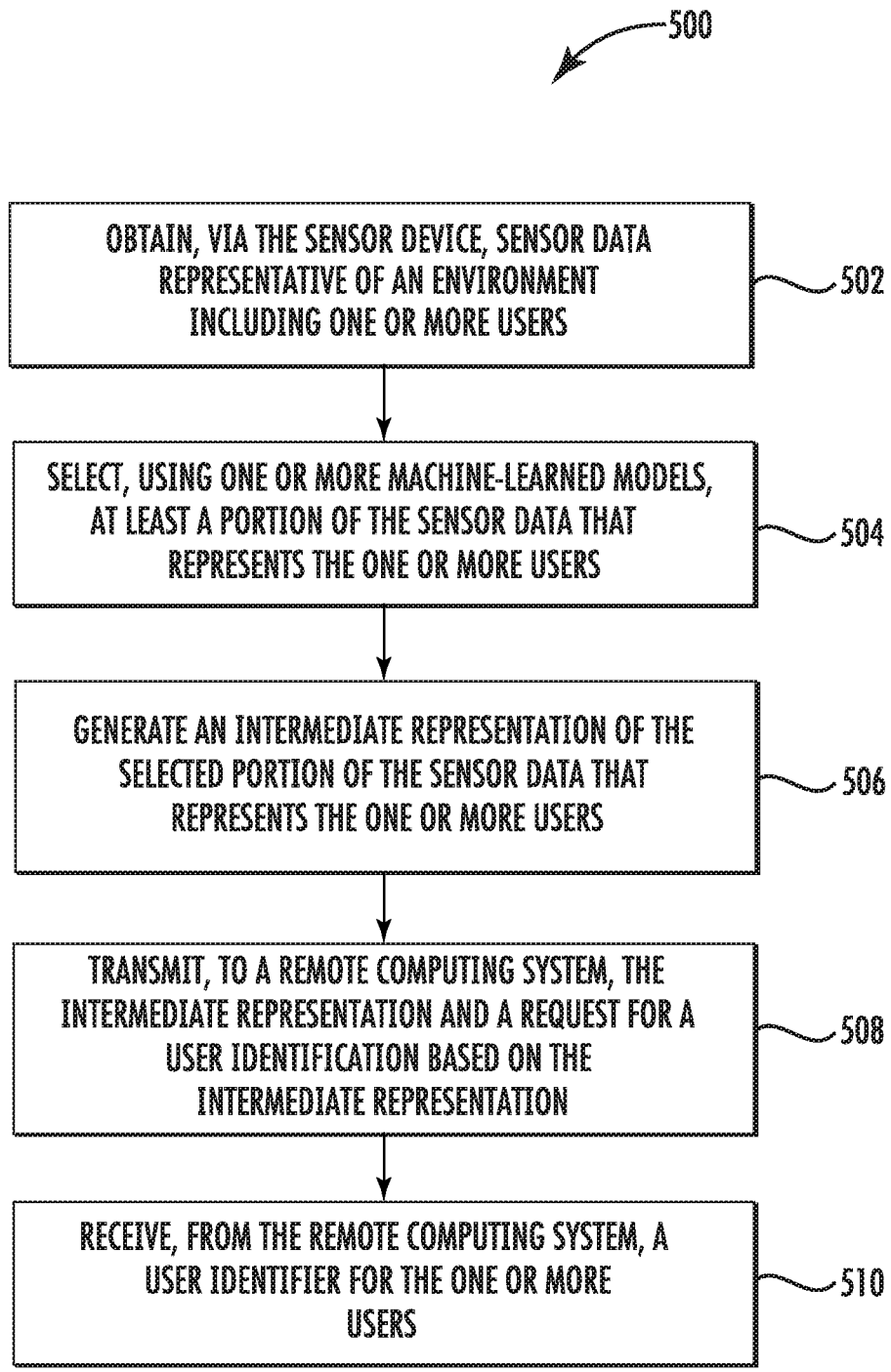
FIG. 5 depicts a flow chart of an example method for performing a hybrid local device and remote server inference system according to example embodiments of the present disclosure.

FIG. 5 depicts a flow chart of an example method (500) for performing a multi-step identification process using a hybrid local/server infrastructure for performing machine learning inference according to an example embodiment of the present disclosure. Although method (500) will be discussed with reference to the local computing device 102 of FIG. 1, method (500) can be performed by any suitable computing system.

In addition, FIG. 5 depicts steps performed in a particular order for purposes of illustration and discussion. Those of ordinary skill in the art, using the disclosures provided herein, will understand that the various steps of method (500) can be omitted, adapted, and/or rearranged in various ways without departing from the scope of the present disclosure.

In some example embodiments, a computing device (e.g., local computing device 102 in FIG. 1) obtains at (502) sensor data of a scene including one or more users. In some examples the sensor data can image data from a camera, audio data from a microphone, radar data from a radar device, or LIDAR data from a LIDAR device. The image data can be uncompressed image data. In some examples, the image data is captured during a video conference.

In some example embodiments, the computing device selects at (504) at least a portion of the sensor data that is associated with the one or more users. For example, the selected portion may be a section of an image that includes the face of one or more users. In another example, the selected portion may be a section of an audio track. In yet another example, the selected portion can be a portion of LIDAR or radar data that includes one or more users.

The computing device generates at (506) an intermediate representation of the selected portion of the sensor data, wherein generating the selected portion of the sensor data is at least one step in a multi-step identification process.

In some example embodiments, the computing device generates an intermediate representation by selecting, based on one or more criteria, a step in the multi-step identification process. The computing device can perform steps in the multi-step identification process until the multi-step identification process reaches an end of the selected step and produces an intermediate representation of the selected portion of the sensor data associated with the selected step, wherein a plurality of steps in the multi-step identification process each produce a distinct intermediate representation of the selected portion of the sensor data.

In some example embodiments, the one or more criteria include a bandwidth currently available to transmit data from the one or more computing devices to the remote computing system. In other example embodiments, the one or more criteria include a computational resource level available at the remote computing system. The intermediate representation can include one or more machine-learned primitives associated with the multi-step identification process.

In one example, the one or more machine-learned primitives can include one or more object localization computations. In some example embodiments, the object localization computations can include determining the locations of specific objects within an image. For example, the computations can include identifying the locations of one or more users (or the user's face) within the image. The one or more machine-learned primitives can include one or more partial computations for the multi-step facial recognition process.

In some example embodiments, the computing device verifies one or more security and privacy criteria before transmitting any data to a remote computing system. In some example embodiments, the privacy criteria include criteria based on a user's selected privacy preferences and satisfying the criteria including that transmitting an intermediate representation of a user's face will not violate their privacy preferences.

Once the criteria have been satisfied, the computing device can transmit at (508) the intermediate representation and a request for a user identification such as a facial recognition inference based on the intermediate representation, the remote computing system configured to perform additional steps of the multi-step identification process using the intermediate representation and the machine-learned system.

The computing device can also transmit, with the intermediate representation, process data identifying a next step in the multi-step facial recognition process to enable the remote computing system to continue the multi-step facial recognition process at the identified next step. This process data allows the remote computing system to continue the multi-step process and arrive at the same inferences as would be generated if the steps were performed at the computing system. In some examples, the process data identifying a next step is included in a header associated with the data as metadata. In addition, the metadata can also include version data that can identify the specific version of the inference engine that was used at the local computing system. In this way, the models can be improved and trained further and thus the specific version used at the local computing device must match the version used at the remote computing system.

At least one step in the multi-step facial recognition process can be performed using a first machine-learned model of the machine-learned system, and the additional steps in the multi-step facial recognition process can be performed by a second machine-learned model of the machine-learned system. As noted above, the first and second machine-learned model can be different layers of a single multi-layer model, each layer performing one or more steps of the multi-step process. In some example embodiments, the request for the user identification comprises transmitting local metadata associated with the image data to the remote computing system.

The computing device receives at (510) a facial recognition identifier for the one or more users. The facial recognition identifier can be selected based on an inference generated by the server system. The facial recognition identifier can include a name of a user. The facial recognition identifier can be received while the video conference is ongoing. The computing system can then display, in a display associated with the one or more computing devices, the name of a user in the one or more users.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 5 respectively depict steps performed in a particular order for purposes of illustration and discussion, the methods of the present disclosure are not limited to the particularly illustrated order or arrangement. The various steps of the methods 5 can be omitted, rearranged, combined, and/or adapted in various ways without deviating from the scope of the present disclosure.

What is claimed is:

1. A computer-implemented method comprising:
obtaining, by one or more computing devices via one or more sensors, sensor data representative of an environment including one or more users;
selecting, by the one or more computing devices using a machine-learned system comprising one or more machine-learned models, at least a portion of the sensor data that is associated with the one or more users;
generating, by the one or more computing devices using the machine-learned system, an intermediate representation of the selected portion of the sensor data that is associated with one or more users, wherein generating the intermediate representation of the selected portion of the sensor data is at least one step in a multi-step identification process;
transmitting, by the one or more computing devices to a remote computing system, the intermediate representation, a request for a user identification based on the intermediate representation, and a header including process data identifying a next step in the multi-step identification process, the remote computing system configured to continue performing additional steps of the multi-step identification process beginning at the identified next step using the intermediate representation and the machine-learned system; and
receiving, from the remote computing system, a user identifier for the one or more users.

2. The computer-implemented method of claim 1, wherein generating the intermediate representation further comprises:
selecting, based on one or more criteria, a step in the multi-step identification process; and
performing steps in the multi-step identification process until the multi-step identification process reaches an end of the selected step and produces an intermediate representation of the selected portion of the sensor data associated with the selected step, wherein a plurality of steps in the multi-step identification process each produce a distinct intermediate representation of the selected portion of the sensor data.

3. The computer-implemented method of claim 2, wherein the one or more criteria include a bandwidth currently available to transmit data from the one or more computing devices to the remote computing system.

4. The computer-implemented method of claim 2, wherein the one or more criteria include a computational resource level available at the remote computing system.

5. The computer-implemented method of claim 1, wherein the at least one step in the multi-step identification process is performed using a first machine-learned model of the machine-learned system, and the additional steps in the multi-step identification process are performed by a second machine-learned model of the machine-learned system.

6. The computer-implemented method of claim 1, wherein the user identifier includes a name of a user.

7. The computer-implemented method of claim 6, further comprising:
displaying, in a display associated with the one or more computing devices, the name of a user in the one or more users.

8. The computer-implemented method of claim 1, wherein the intermediate representation includes one or more machine-learned primitives associated with the multi-step identification process.

9. The computer-implemented method of claim 8, wherein the one or more machine-learned primitives include one or more object localization computations.

10. The computer-implemented method of claim 8, wherein the one or more machine-learned primitives include one or more partial computations for the multi-step identification process.

11. The computer-implemented method of claim 1, wherein transmitting the intermediate representation and the request for the user identification comprises:
transmitting local metadata associated with the image data to the remote computing system.

12. The computer-implemented method of claim 1, wherein the method further comprises, prior to transmitting the intermediate representation and the request for the user identification, verifying one or more security and privacy criteria.

13. The computer-implemented method of claim 1, wherein the sensor data is uncompressed image data.

14. The computer-implemented method of claim 13, wherein the uncompressed image data is captured during a video conference.

15. The computer-implemented method of claim 14, wherein the user identifier is received while the video conference is ongoing.

16. A device comprising:
a processor;
one or more sensors;
a display; and
a memory that stores instructions that, when executed by the processor, cause the device to perform operations, the operations comprising:
obtaining, via the one or more sensors, image data of an environment including one or more users;
selecting, using one or more machine-learned models, at least a portion of the sensor data that is associated with one or more users;
generating, using the one or more machine-learned models, an intermediate representation of the selected portion of the sensor data that is associated with the one or more users, wherein generating the intermediate representation of the selected portion of the sensor data is at least one step in a multi-step identification process;
transmitting, to a remote computing system, the intermediate representation and a request for a user identification based on the intermediate representation, a request for a user identification based on the intermediate representation, and a header including process data identifying a next step in the multi-step identification process, the remote computing system configured to continue performing additional steps of the multi-step identification process beginning at the identified next step using the intermediate representation and the one or more machine-learned models; and
receiving, from the remote computing system, a user identifier for the one or more users.

17. The device of claim 16, wherein the user identifier includes a name of a user and the operations further comprise:
displaying, in the display, the name for a user in the one or more users.

18. A non-transitory computer-readable medium storing instructions that, when executed by one or more computing devices, cause the one or more computing devices to perform operations, the operations comprising:

obtaining, via one or more sensors, sensor data of a scene including one or more users;

generating, using the one or more machine-learned models, an intermediate representation of the sensor data, wherein generating the intermediate representation of the sensor data is at least one step in a multi-step identification process;

transmitting, to a remote computing system, the intermediate representation and a request for a user identification based on the intermediate representation, and a header including process data identifying a next step in the multi-step identification process, the remote computing system configured to continue performing additional steps of the multi-step identification process beginning at the identified next step using the intermediate representation and one or more machine-learned models; and receiving, from the remote computing system, a facial recognition identifier for the one or more users.

19. The non-transitory computer-readable medium of claim 18, wherein the facial recognition identifier includes a name of a user and the operations further comprise:

displaying, in a display associated with the one or more computing devices, the name for a user in the one or more users.

* * * * *